US012670805B2

(12) United States Patent
Kranz et al.

(10) Patent No.: US 12,670,805 B2
(45) Date of Patent: Jun. 30, 2026

(54) METHOD AND DEVICE FOR LITERACY DEVELOPMENT

(71) Applicant: BRITE-LITER INC., Hughesville, PA (US)

(72) Inventors: Benjamin Kranz, Hughesville, PA (US); David Boyle, Montoursville, PA (US); Michael Dubinovsky, Mesa, AZ (US); Ashley N Patterson, State College, PA (US); Shari B Michael, Hughesville, PA (US); Igor G. Kajun, Dnepr (UA); Anton Tkachenko, Boryspil (UA)

(73) Assignee: BRITE-LITER INC., Hughesville, PA (US)

( * ) Notice: Subject to any disclaimer, the term of this patent is extended or adjusted under 35 U.S.C. 154(b) by 1056 days.

(21) Appl. No.: 17/825,129

(22) Filed: May 26, 2022

(65) Prior Publication Data

US 2022/0383770 A1 Dec. 1, 2022

Related U.S. Application Data

(60) Provisional application No. 63/193,276, filed on May 26, 2021.

(51) Int. Cl.
| | |
|---|---|
| *G09B 19/00* | (2006.01) |
| *G09B 5/02* | (2006.01) |
| *G09B 17/02* | (2006.01) |

(52) U.S. Cl.
CPC .............. *G09B 19/00* (2013.01); *G09B 5/02* (2013.01); *G09B 17/02* (2013.01)

(58) Field of Classification Search
None
See application file for complete search history.

(56) References Cited

U.S. PATENT DOCUMENTS

| | | | | | |
|---|---|---|---|---|---|
| 3,327,406 | A | * | 6/1967 | Baker | .................... G09B 3/085 |
| | | | | | 273/293 |
| 6,070,992 | A | * | 6/2000 | Schnell | ................. G02B 27/20 |
| | | | | | 362/109 |

(Continued)

FOREIGN PATENT DOCUMENTS

| | | |
|---|---|---|
| CN | 202349607 U | 7/2012 |
| CN | 204240066 U | 4/2015 |

(Continued)

OTHER PUBLICATIONS https://alilo.fi/en/tuote/alilo-talking-pen/, Apr. 11, 2023, 8 pages.

(Continued)

*Primary Examiner* — James B Hull

(57) ABSTRACT

A literacy development device includes a light source that provides a general white illumination area and an adjustable light within the illumination area, both from the same light source. The adjustable light can be changed in shape and color through a LCD screen provided within the device. The device contains a rechargeable battery and various buttons for changing functions, light parameters, and other controls. The device is preferably usable in teaching applications, especially with children and other students with learning and/or attention issues. The device is useful in drawing attention to certain areas of a surface that includes written language, including a letter, a group of letters, a word, or a sentence, through use of the adjustable light to highlight, underline, or otherwise draw visual attention to a particular area of the surface within the illumination area.

16 Claims, 8 Drawing Sheets

(56)     References Cited

U.S. PATENT DOCUMENTS

| | | | | |
|---|---|---|---|---|
| 7,077,525 | B2 | 7/2006 | Fischer et al. | |
| 7,198,382 | B2 * | 4/2007 | Donovan ............... | B42D 3/123 |
| | | | | 362/184 |
| 2003/0215776 | A1 * | 11/2003 | Chesters ............... | G09B 17/02 |
| | | | | 434/183 |
| 2009/0298381 | A1 * | 12/2009 | Fink ....................... | A63H 33/38 |
| | | | | 446/80 |
| 2016/0046141 | A1 * | 2/2016 | Von Letscher ......... | B42D 1/008 |
| | | | | 281/38 |
| 2016/0321942 | A1 * | 11/2016 | Silver ................... | A63H 33/26 |

FOREIGN PATENT DOCUMENTS

| | | | |
|---|---|---|---|
| CN | 107479628 | A | 12/2017 |
| DE | 202019101801 | U1 | 1/2020 |
| JP | 2020095266 | A | 6/2020 |

OTHER PUBLICATIONS https://smartyoudao.com/products/youdao-electronic-dictionary-scan-translation-pen-3-global-version, Apr. 11, 2023, 18 pages.
https://www.youtube.com/watch?v=29WhzmAcAjU Mar. 25, 2020, 1 page.

\* cited by examiner

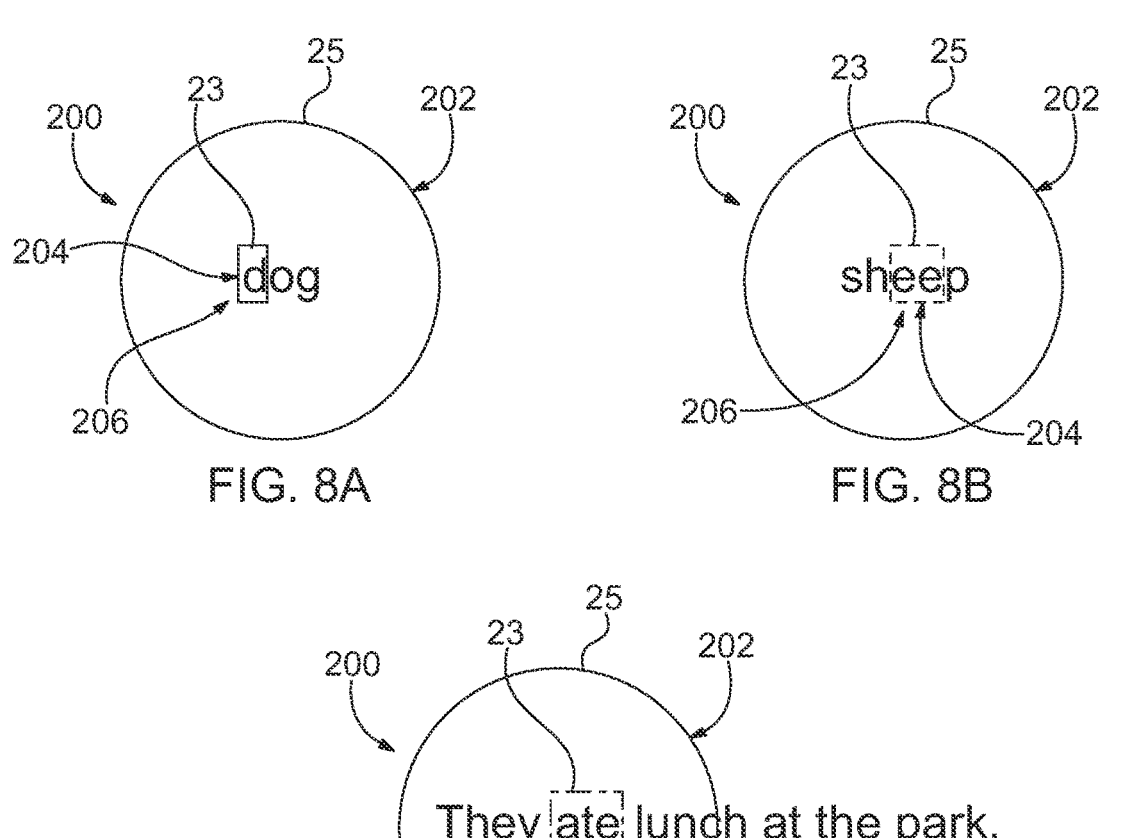
FIG. 8A          FIG. 8B
FIG. 8C
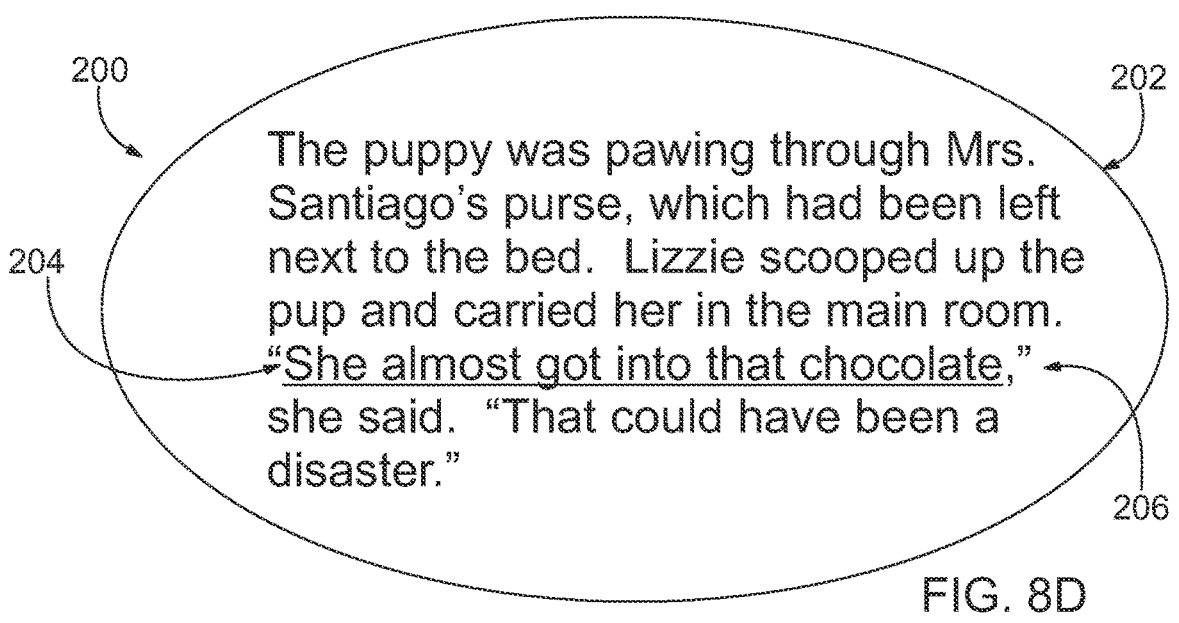
FIG. 8D

METHOD AND DEVICE FOR LITERACY DEVELOPMENT

CROSS-REFERENCE TO RELATED APPLICATIONS

The present invention claims priority to U.S. provisional patent application No. 63/193,276, filed on May 26, 2021, the entirety of which is incorporated by reference.

STATEMENT REGARDING FEDERALLY SPONSORED RESEARCH

Not applicable.

PARTIES TO A JOINT RESEARCH AGREEMENT

Not applicable.

SEQUENCE LISTING

Not applicable.

STATEMENT REGARDING PRIOR DISCLOSURE

Not applicable.

BACKGROUND OF THE INVENTION

Field of the Invention

The present invention is directed to a device having a light source that provides both a general white illumination area and an adjustable target light, corresponding to an image, within the illumination area. The device has the ability to change and control color of pixels within a LCD screen to various colors to change the color and shape of the target light and corresponding image within the general white illumination area. The device contains a rechargeable battery and has various buttons to control operation of the device and parameters of the image. The device is preferably usable in teaching applications, especially with children and other students with learning and/or attention issues. The device is useful in drawing attention to certain areas of any non-reflective surface that could include written language, including a letter, a group of letters, a word, or a sentence. The devices is also usable in learning associated with other visual information, including graphs, charts, illustrations, images, maps, etc.

Brief Discussion of Related Art

A majority of the sensory cortex in humans is devoted to processing visual information. In children, especially young children under two years of age, this percentage is even higher. While smell is acknowledged as being most closely linked to direct memory, the cause of this is believed to be because it skips by the thalamus. Considering how many things the average person sees in a 60-second period, and has learned to process without conscious thought, versus how many smells the same average person processes in the same amount of time, vision is much more important in day-to-day life as humans age.

It is estimated that 62-67% of the population are visual learners, and another 8-15% process auditory information the best. Further, it has been shown that in typical reading situations preschool-aged children look at print infrequently, corresponding to 5-6% of visual fixations. It would be advantageous to utilize visual stimuli to better engage children, and other students, with print or other written language to better aid in advancing literacy, including reading, writing, and comprehension skills.

U.S. Pat. No. 7,077,525 B2 to Fischer et al. teaches an LED flashlight that uniformly distributes light at a selectable distance. The LED flashlight of Fischer et al. can select colors and various shapes, but remains a same shape at distance D. The LED flashlight of Fischer et al. does not include a shape inside of an outer uniform light or shape.

JP 2020095266 A to Shumpei et al. teaches a portable illumination device including different diffraction units that have been inserted into the attachment/detachment port of the slot mechanism. The device of Shumpei et al. uses coherent light of single color, typical of a laser, and can create different characters, pictures, symbols, etc.

DE 202019101801 U1 to Delvis teaches a device for projecting at least two individual images onto a projection surface. The device creates an illusion of animation by rapidly switching back and forth between the at least two individual images. As mentioned in an alternative embodiment, the device may include a mixing element to mix light emitted from multiple single-color light source elements. An LCD element is only used to block light and form image of single color CN 107479628 A to Zhenyuan teaches a flashlight and projection switching system whereby a device is operable as a flashlight and can also switch to a projection mode. In the projection mode, the device can project images from a video software.

CN 204240066 U to Kim Paul Y. teaches a LED flashlight that uses a light-transmitting cover to manually change a single color emitted from the flashlight CN202349607U U to Lunchun et al. teaches a flashlight device that includes a miniature LED projector for projecting continuous pictures or video onto a surface. The device sized to be easily carried and inexpensive.

While the above discussed references generally teach LED flashlights, the references do not teach a device for creating an adjustable image within a general white illumination area, the adjustable image color and shape being changeable within the white illumination area. Further, none of the discussed references disclose a method for using such a device in improving literacy development in students. Embodiments of the device and method of the instant invention are discussed in further detail below.

BRIEF SUMMARY OF THE INVENTION

The device attracts visual attention of a viewer to a targeted area of an illuminated surface through placement of the image on a surface. Preferably, the targeted area contains one or more letters, words, or sentences. Visual attention is preferably attracted to the targeted area through illumination of a surrounding area and selection of the targeted area by a target light. Illumination of the surrounding area is preferably accomplished through emission of surrounding light from the device, typically white light. The target light is emitted from the device simultaneously along with the surrounding light. The target light has a different color than that surrounding light, and may include different geometric shapes. Commonly, the image resulting from the target light is rectangular or linear in shape, to either highlight or underline, respectively, letters, words, or sentences in the targeted area. The device is designed to be used as a learning tool for a young audience. The device may be used in a poorly lit environment, such as during bedtime reading, as it emits both the surrounding light and the target light. Additionally, the device can project the target light alone, allowing use of the device in an area of adequate lighting, such as in a home-schooling environment at a kitchen table, to capture and keep visual attention while processing auditory input at the same time, resulting in a substantial increase in learning and retention.

Accordingly, an embodiment of the device for accentuating literal elements to practice literacy skills, includes a longitudinal housing, configured to be held in one or both hands of a user, having opposed longitudinal ends; a lens system longitudinally arranged within the longitudinal housing adjacent to an open end of the opposed longitudinal ends; a circuit board housed within the longitudinal housing; a light-emitting diode (LED) housed within the longitudinal housing; a liquid crystal display (LCD) screen housed within the longitudinal housing; and a power source housed within the longitudinal housing, the power source connected, and supplying electrical power, to the circuit board, the light-emitting diode, and the LCD screen, wherein, when the power source supplies the electrical power, light is generated by the LED, through the LCD screen, and through the lens system and configured to be emitted onto a surface having one or more literary elements, graphs, charts, illustrations, images, or other visual information, and wherein the light emitted on the surface includes an image and a surrounding light, the image centralized within the surrounding light and having a different color than the surrounding light.

The device embodiment may further include the lens system having a lens tube and a plurality of lenses coaxially arranged within the lens tube. The plurality of lenses may include at least three lenses. The plurality of lenses may at least four lenses. The lens system may be longitudinally movable within the longitudinal housing along a central longitudinal axis.

The device embodiment may further include an illumination optical component for directing the light toward the LCD screen, wherein the illumination optical component is a collimator and lens, a reflector, or a total internal reflection (TIR) lens.

For this device embodiment, the image can be a shape, wherein the shape is a square, a circle, a triangle, a heart, a star, a hexagon, a line, or a rectangle adjustable in shape to become a line. The image can be, in addition or independently, an alphabetical letter or character chosen from an alphabet. The image can be, in addition or independently, a color chosen from red, blue, yellow, green, orange or violet.

The device embodiment may further include a plurality of buttons, each button connected to the circuit board and programmed to allow a user to control one or more parameters of the device, including powering the device on and off, brightness of the light, a size of the image, a color of the image, a shape of the image, a letter of the image, and a color of the surrounding light.

An embodiment of a method of improving literacy, includes providing a non-digital medium with literal elements; selecting a group of literal elements by using a light source to illuminate an area on a surface of the non-digital medium; and visually directing the reader's attention to a specific literal element of the group of literal elements by using the light source to illuminate or draw attention to the specific literal element with at least one image within the area, the at least one image being a color other than white and being a different color than the area on the surface of the non-digital medium; wherein visually directing the reader's attention to the specific literal element assists the reader in learning reading and writing skills.

For this method embodiment, the area may illuminate white light.

For this method embodiment, the area may be circular in shape.

For this method embodiment, the area may cover a portion of the surface of the non-digital medium.

For this method embodiment, a user other than the reader may operate the light source.

For this method embodiment, the light source may be a device, having a longitudinal housing, configured to be held in one or both hands of a user, having opposed longitudinal ends; a lens system longitudinally arranged within the longitudinal housing adjacent to an open end of the opposed longitudinal ends; a circuit board housed within the longitudinal housing; a light-emitting diode (LED) housed within the longitudinal housing; a liquid crystal display (LCD) screen housed within the longitudinal housing; and a power source housed within the longitudinal housing, the power source connected, and supplying electrical power, to the circuit board, the light-emitting diode, and the LCD screen, wherein, when the power source supplies the electrical power, light is generated by the LED, through the LCD screen, and through the lens system and configured to be emitted onto a surface having one or more literary elements, graphs, charts, illustrations, images, or other visual information, and wherein the light emitted on the surface includes an image and a surrounding light, the image centralized within the surrounding light and having a different color than the surrounding light.

For this method embodiment, the image may be a shape, wherein the shape is a square, a circle, a triangle, a heart, a star, a hexagon, or a line.

For this method embodiment, the image may be an alphabetical letter or character chosen from an alphabet.

For this method embodiment, the image may have a color chosen from red, blue, yellow, green, orange or violet.

For this method embodiment, the light source may be a hand-held device.

BRIEF DESCRIPTION OF THE SEVERAL VIEWS OF THE DRAWING

A better understanding of the invention will be had in reference to the following drawings:

FIG. 8A is an illustration of an illuminated surrounding area and targeted area, the areas illuminated by the device of FIG. 1;

FIG. 8B is an illustration of an illuminated surrounding area and targeted area, the areas illuminated by the device of FIG. 1;

FIG. 8C is an illustration of an illuminated surrounding area and targeted area, the areas illuminated by the device of FIG. 1;

FIG. 8D is an illustration of an illuminated surrounding area and targeted area, the areas illuminated by the device of FIG. 1;

DETAILED DESCRIPTION OF THE INVENTION

The device and method for improving literacy development solves the problem of declining literacy rates in the United States of America due to increased digital device usage and less dedicated learning time by providing a hand-held illumination device that highlights literal elements, including letters, words, or sentences, to provide visual stimulation while students learn literacy skills, including reading, writing, and comprehension skills.

Figure 1:
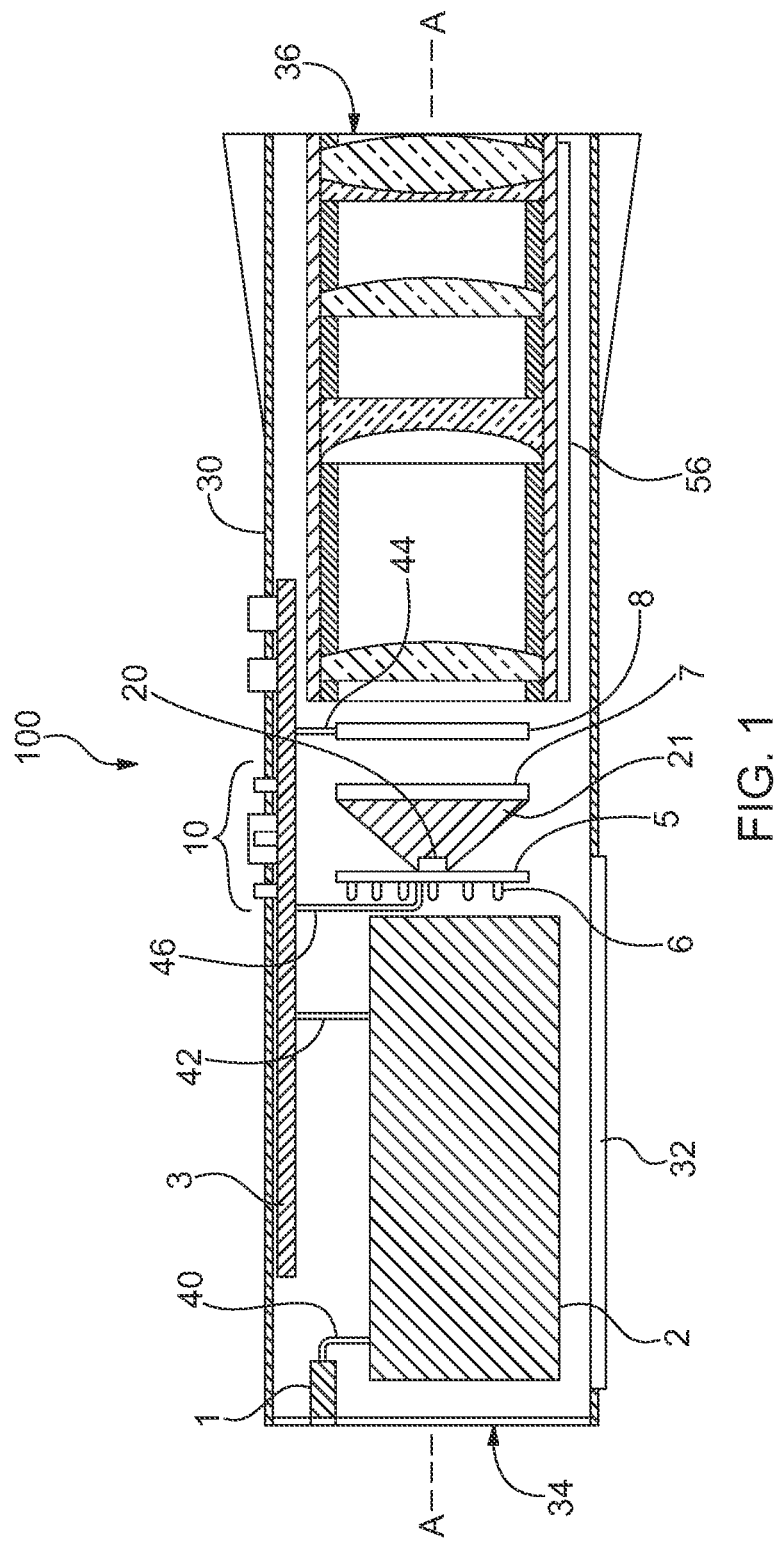
FIG. 1 is a cross-sectional side elevational view of an embodiment of a device along a longitudinal axis.

FIG. 1 shows an embodiment of the device 100 for improving literacy development. The device 100 is designed to be hand-held and controlled with one or two hands. User controls 10 of the device, which may include one or more buttons 4, 12, 13, 14, 15, 16, 17, 18, and 22 depending on various embodiments of the device 100, are laid out such that they provide symmetrical usage, or use with either hand. The device 100 has been designed with a minimum number of parts for ease of manufacture and assembly.

Figure 2:
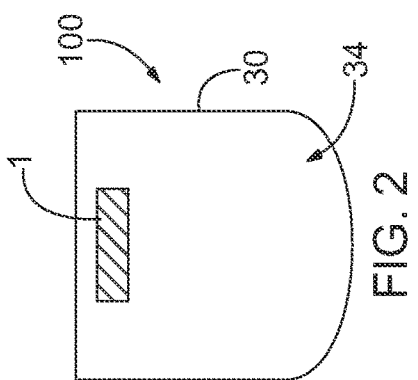
FIG. 2 is an end view of the device of FIG. 1.
Figures 6, 7:
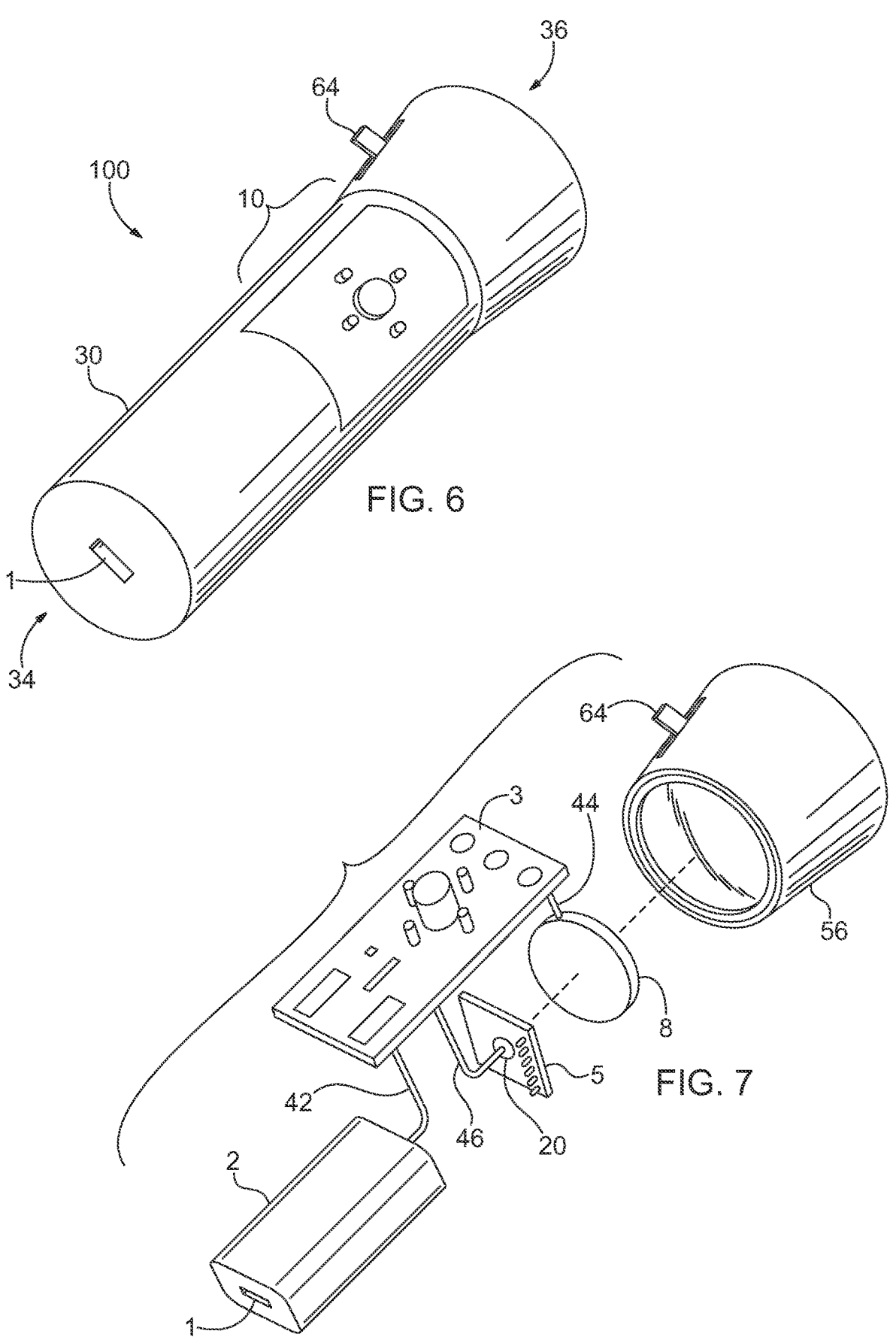
FIG. 6 is a perspective view of an alternative embodiment of the device.
FIG. 7 is an exploded view of internal components of the device embodiment shown in FIG. 6, also showing a control pad area of FIG. 3B.

The device 100 includes a tubular housing 30 that longitudinally extends along a longitudinal axis A. The housing 30 has oppositely arranged longitudinal ends 34 and 36. The housing 30 may or may not be perfectly cylindrical, as long as it is shaped to be easily gripped in at least one hand by a user. The housing 30 of the device 100 embodiment shown in FIG. 1 is not perfectly cylindrical, as shown in FIG. 2. However, the housing 30 of the device 100 embodiment of FIG. 6 is perfectly cylindrical. A cover 32 is removably fastened to the housing 30, and sits within an opening of the housing, the opening allowing access into a hollow interior of the housing to interact with components secured therein, including a rechargeable battery 2. The cover 32 is preferably fastened to the housing 30 by small magnets. However, the cover 32 may otherwise be removably fastened to the housing 30 by screws and threads, tabs, or similar fasteners.

A port 1 is provided along the longitudinal end 34 of the housing 30, as shown in FIG. 2. The port 1 is electrically connected to the rechargeable battery 2 via connection 40. The port 1 is connectable to an external power supply via a cable or wire, not shown, to recharge the rechargeable battery via the electric connection between the port 1 and the rechargeable battery 2. In a preferred embodiment of the device 100, the port 1 is a USB port. The port 1 may otherwise be shaped and structured to receive other types of connectors attached to cables or wires for the purpose of transferring electrical energy to the rechargeable battery 2.

In an alternative embodiment, the rechargeable battery 2 may be excluded and the device 100 instead powered solely through constant connection with an external power supply via a wire or cable.

In another embodiment, the port 1 may be excluded and the rechargeable battery 2 replaced with one or more non-rechargeable or replaceable batteries for providing power to the same structures as the rechargeable battery 2, as described herein.

Referring again to the embodiment of FIG. 1, the rechargeable battery 2 is electrically connected to and powers a circuit board 3 via connection 42. The circuit board 3 contains a microcontroller for running software developed for use on the device 100, and receiving inputs and sending outputs from and to various other components of the device. The microcontroller has all necessary power stabilization and communication components and an interface for connecting to a computer, which may be done via the port 1 and a wire or cable. The circuit board 3 also has a power management system for all components of the device 100, which include a linear regulator and capacitors. The linear regulator gives smooth and consistent power for all electrically-powered components, and its efficiency and low power losses improve battery life of the rechargeable battery 2 to extend usage of the device 100.

A LCD (liquid crystal display) screen 8 is connected to microcontroller using SPI protocol, which provides a fast response and desired refresh rates. The LCD screen 8 has high resolution for projecting small details, and is connected to the rechargeable battery 2, or other present power source, through the linear regulator for more effective and safe operation. The LCD screen 8 is controlled by a MOSFET transistor. Brightness can therefore be fine-tuned, and an LED (light-emitting diode) 20, which is a light source for the LCD screen 8, turned off automatically if the device 100 is not used for a determinable amount of time. This feature also increases battery life.

As previously mentioned, the device 100 can be connected to and controlled by a personal computer via the port 1. A Schottky diode is provided on the circuit board 3 to ensure electrical safety and prevent current from flowing from the USB connection to the battery Connections 40, 42, 44, and 46 are shown as simplified in the FIG. 1 for ease of reading. The connections 40, 42, 44, and 46 may be wires, cables, or other conductive materials connecting two or more structures together and capable of carrying an electric current.

Figure 3B:
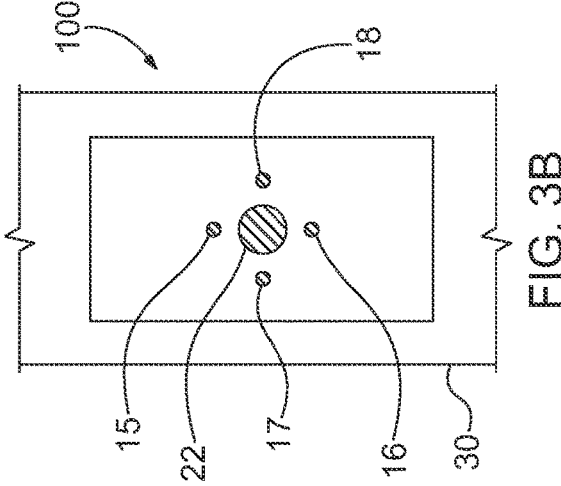
FIG. 3B is a top plan view along a partial length of a housing showing a control pad area of an alternative embodiment of the device of FIG. 1.
Figure 3A:
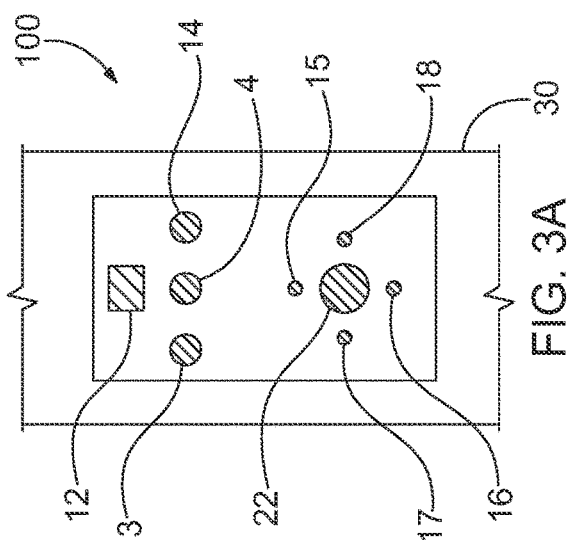
FIG. 3A is a top plan view along a partial length of a housing showing a control pad area of the device of FIG. 1.

FIG. 3A shows the buttons 4, 12, 13, 14, 15, 16, 17, 18, and 22 that are connected to and interact with the software stored on the microprocessor of the circuit board 3 via a control button module attached to the circuit board. Via the buttons 4, 12, 13, 14, 15, 16, 17, 18, and 22, the user can operate the software stored in the microprocessor. The software allows the user to access, change, and control various features and parameters of the device via different combination of button inputs, which will be described further herein. Generally, the features include changing the size of the projected image; centering of the displayed image to compensate for possible optics misalignment; rotating the image on the LCD screen to make projection more convenient; adjusting the LED 20 brightness; and software replacement of the functions of the left button 17 and right button 18.

Figure 4:
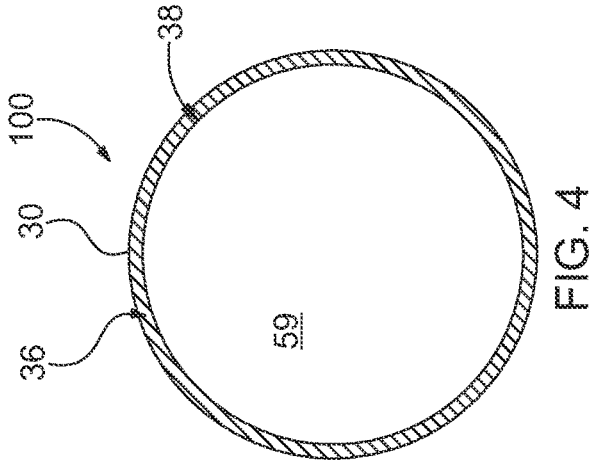
FIG. 4 is a front view of the device of FIG. 1.

FIG. 4 shows a front view of the device 100 along the longitudinal end 36. This view shows the opening 38 of the housing 30 with the lens 60 positioned within the opening. In other embodiments of the device 100, as provided in FIGS. 9 and 10, lens 59 may be positioned within the opening 38.

Figure 5:
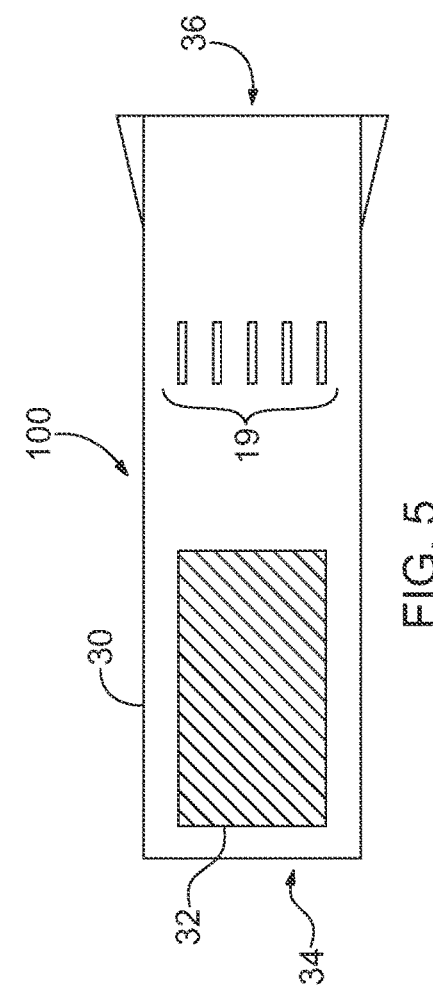
FIG. 5 is a side view of the device of FIG. 1.

FIG. 5 shows a plurality of vents 19 in the housing 30, which are openings into the hollow interior of the housing that allow a free flow of air into and out of the housing. The vents 19 therefore provide some cooling of internal components with the housing 30.

Several features of the device 100 result from operation of the software in conjunction with other structures. Via the software, images are displayed by the LCD screen 8 in mirrored form, i.e. the microprocessor inverts the projected image on the LCD screen 8. Further, the device 100 has an energy-saving mode, or a sleep mode. The sleep mode is activated by long pressing, or holding down, the button 12, and sleep mode is deactivated by pressing the button 12 again. Pressing any one of the buttons 4, 12, 13, 14, 15, 16, 17, 18, or 22 is accompanied by a contact bounce, which is a series of quick circuits and openings of the button contact. To exclude false positives of button presses, the software checks the button press, taking into account the bounce of its contacts. The software also reduces a clock frequency from 16 megahertz (MHz) to 8 MHz in order to operate the microcontroller at low supply voltages, which further saves battery life. The software also generates and transmits commands and data to the LCD screen 8 via a SPI interface. Lastly, brightness of a projected image depends on the brightness of the LED screen that shines through the display matrix. The software controls the brightness of the LED screen 8 by changing a duty cycle of a pulse-width modulation of voltage supplying the LED screen.

In the embodiment of the device 100 shown in FIG. 3A, an algorithm of the software proceeds along the following steps:

1. Setting up pins and peripheral modules of the microcontroller, preparing the LCD screen 8 for operation, starting setting global variables. Conclusion on the LCD screen 8 of the firmware version and greetings.
2. The main software running in a loop.
2.1. Checking the status of buttons 4, 12, 13, 14, 15, 16, 17, 18, or 22
2.2. Depending on the buttons pressed, the following actions are performed:
   2.2.1. Button 4.
      2.2.1.1. first press—turns the device 100 'on'. A default image 23 including a shape is shown, preferably a red heart, on a white background (medium brightness)
      2.2.1.2. second press—turns the device 100 'off'.
   2.2.2. Button 14.
      2.2.2.1. Each press—toggles between various geometric shapes being the image 23 shown by the device 100. The image 23 may be toggled between, but not limited to, a square, a circle, a triangle, a heart, a star, a hexagon, and a line.
   2.2.3. Button 12. (When the image 23 is set to be a square)
      2.2.3.1. first press—the image 23 is doubled in width.
      Pressing the button 15 will cause the image 23 to increase vertical size.
      Pressing the button 16 will cause the image 23 decrease the vertical size.
      Pressing the button 18 will cause the image 23 to increase horizontal size.

Pressing the button 17 will cause the image 23 to decrease horizontal size.
      2.2.2.3. second press—the image 23 returns to a starting size.
   2.2.4. Button 13.
      2.2.4.1. Each press—toggles between various colors of the image 23 shown by the device 100. The color of image 23 may be toggled between, but not limited to, red, blue, yellow, green, orange, and violet.
   2.2.5. Button 22.
      2.2.5.1. first press—switches the image 23 from a choice of geometric shapes to a choice of alphabetic letters. Pressing button 12 will toggle the image 23 between each letter of a programmed alphabet. Programmed alphabets may include, but are not limited to, English, Spanish, Hebrew, Japanese, Chinese, Hindi, and Arabic, as examples.
      2.2.5.2. second press—switches the image 23 from a choice of alphabetic letters to a choice of geometric shapes.

In the embodiment of the device 100 shown in FIG. 3B, an algorithm of the software proceeds along the following steps:

1. Setting up pins and peripheral modules of the microcontroller, preparing the LCD screen 8 for operation, starting setting global variables. Conclusion on the LCD screen 8 of the firmware version and greetings.
2. The main software running in a loop.
2.1. Checking the status of buttons 15, 16, 17, 18, and 22
2.2. Depending on the buttons pressed, the following actions are performed:
   2.2.1. Button 22 first press—turns device 'on'. Default image 23 is red heart, shown on white light background (medium brightness). Then:
   if press button 15—toggles color of the image 23 between: blue, yellow, green, orange, violet, red;
   if press button 16—toggle color of the image 23 in reverse between: red, violet, orange, green, yellow, blue;
   if press button 18—toggles image 23 between shapes: circle, triangle, hexagon, star, heart; and
   if press button 17—toggles image 23 in reverse between shapes: heart, star, hexagon, triangle, circle.
   2.2.2. Button 22 second press—image 23 retains color from previous sequence, change image 23 to square shape, white light 'on' (medium brightness).
Then:
   if press button 15—increases vertical size of square/rectangle;
   if press button 16—decreases vertical size of square/rectangle;
   if press button 18—increases width of square/rectangle; and
   if press button 17—decreases width of square/rectangle.
   2.2.3. Button 22 third press—image 23 retains size and color from previous square/rectangle sequence, white light 'on' (medium brightness). Then:
   if press button 15—increase brightness to high;
   if press button 16—decreases brightness to low;
   if press button 18—quickly doubles width of square/rectangle (hot key);
   if press button 18 again—returns to original width (½ width); and if press button 17—quickly changes width of square/ rectangle ($2^{nd}$ hot key) to 5× original width; and if press button 17 again—returns to original width.

2.2.4. Button 22 fourth press—retains size and color from previous square/rectangle sequence, white light 'off'. Then:

if press button 15—toggles color of image 23 between: blue, yellow, green, orange, violet, red;

if press button 16—toggle color of image 23 in reverse between: red, violet, orange, green, yellow, blue;

if press button 18—toggles image 23 between: rectangle, circle, triangle, hexagon, star, heart (now with rectangle); and if press button 17—toggles image 23 in reverse between: heart, star, hexagon, triangle, circle, rectangle (now with rectangle).

2.2.5. Button 22 fifth press—retains color, changes image 23 to letter 'A'. Then:

if press button 15—toggles image 23 between color: blue, yellow, green, orange, violet, red;

if press button 16—toggles image 23 in reverse between color: red, violet, orange, green, yellow, blue;

if press button 18—toggles image 23 between letters forward in alphabet; and if press button 17—toggles image 23 between letters of alphabet in reverse.

2.2.6. Button 22 press—repeats cycle (from point 2.1).

2.2.7. If button 22 pressed and held for 3 seconds— device put to sleep.

This works anywhere in the main program.

When the button 4 is pressed in the embodiment of FIG. 3A, or button 22 is pressed in the embodiment of FIG. 3B, power is sent to the LED 20, which is mounted to a holder 5. Multiple heat sinks 6 are connected to the LED 20 via the holder 5 and are provided for heat dissipation. The light generated by the LED 20 is directed toward the longitudinal end 36 of the device by illumination optical components. The illumination optical components in FIG. 1 are represented by a collimator 21 and a lens 7. The collimator 21 narrows the light produced by the LED 20, and the lens further arranges the light before it travels through the LCD screen 8.

Instead of the collimator and lens 7, the illumination optical components can alternatively include the LED 20 with a reflector 50, also referred to as a reflector lamp or reflector bulb, which is typically a conically-shaped structure with a reflective surface for creating a wide beam angle.

Further, the illumination optical components can alternatively include the LED 20 with a TIR lens instead of the separate collimator 21 and lens 7 or reflector 50. The TIR, or total internal reflection, lens includes a lens and collimator surface all one structure. Whereas the reflector 50 only redirects light that reflects off of the reflector's surface, which is less than all of the light produced by the LED 20, the TIR lens controls the reflection of all light photons leaving the TIR lens.

Further still, the lens 7 of the illumination optical components may be an aspherical lens, or a lens with a radius of curvature that varies from a center to an edge of the lens. Using an aspherical lens creates a sharper image and reduces or eliminates certain optical imperfections, such as chromatic aberrations or field curvature. The aspherical lens 7 preferably used with the collimator 21. Further, it should be understood that the lens 7 may be spherical, which would again be used with the collimator 21.

Pressing button 4, or 22 depending on embodiments of the device as described, also sends power to the LCD screen 8. The light emitted from the LED 20 will continue through the LCD screen 8. An active matrix, thin-film-transistor (TFT) LCD is the most optimal LCD screen 8 for the device 100. The LCD screen 8 is controlled by the microprocessor of the circuit board 3 via an interface, such as the SPI interface, an I2C interface, or similar interface. In the TFT LCD screen 8, there is a transistor at each red, green, and blue subpixel. Via the software, this allows a user to better control image brightness and provides better image quality, including high contrast, strong layering, and bright colors.

The LCD screen is preferably 23 millimeters (mm)×23 mm in size, with 240×240 pixels. Pixel pitch equals approximately 0.13 mm. This represents a sampling frequency of 1 mm/0.13 mm=8 pixel/mm. The Nyquist limit calculates to 4 lp/mm. Therefore, optical system with MTF resolution of 5 line pairs (lp)/mm is adequate.

Figure 9:
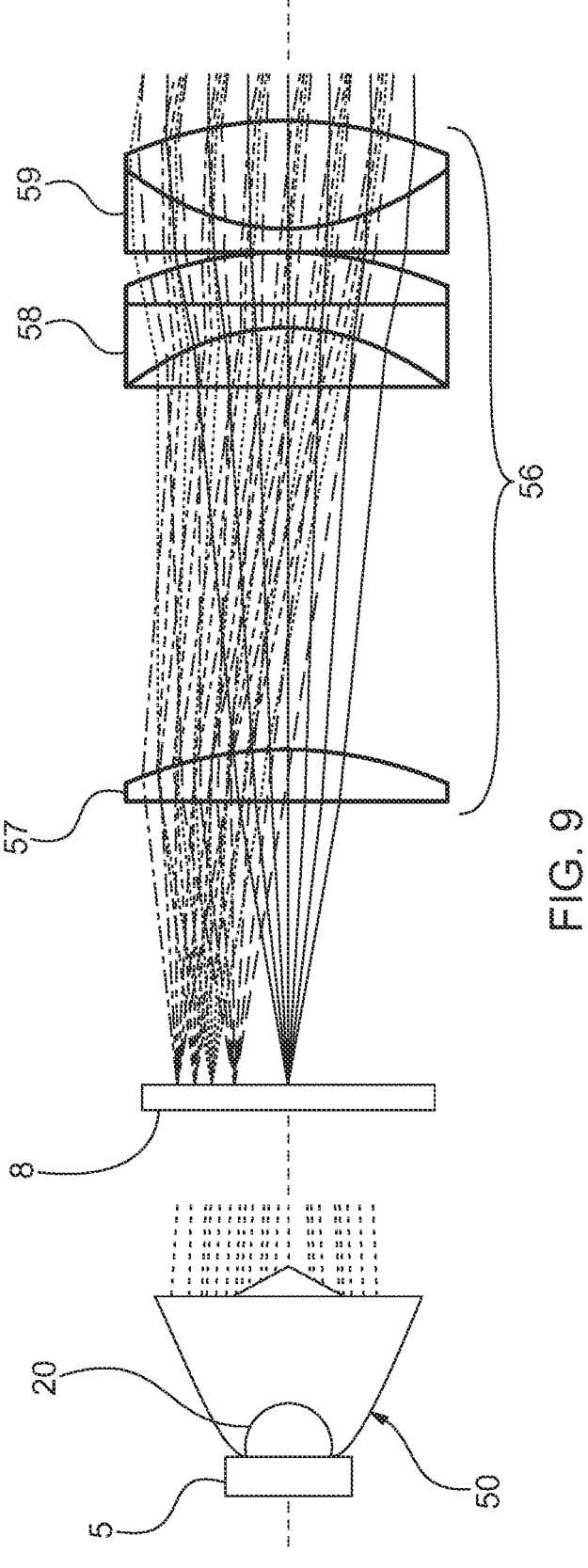
FIG. 9 is an illustration of a light emission diode, liquid crystal display screen, and a preferred embodiment of a lens system.

Upon leaving the LCD screen 8, the light travels toward the longitudinal end 36 through a lens system 56, which includes a plurality of lenses. FIG. 9 shows a preferred configuration of the lens system, with lenses 57, 58, and 59, along with the LED 20 and LCD screen 8. The lenses 57, 58, and 59 may be separate or may form a compound lens. The light travels through the lenses 57, 58, and 59 of the lens system, then out of the device 100 via an opening 38 in the housing 30 along the longitudinal end 36, to project one or more images onto a surface at a varying distance from the device 100. The lenses of the lens system are preferably plastic molded lenses, but may be made from glass or similar materials.

Figure 10:
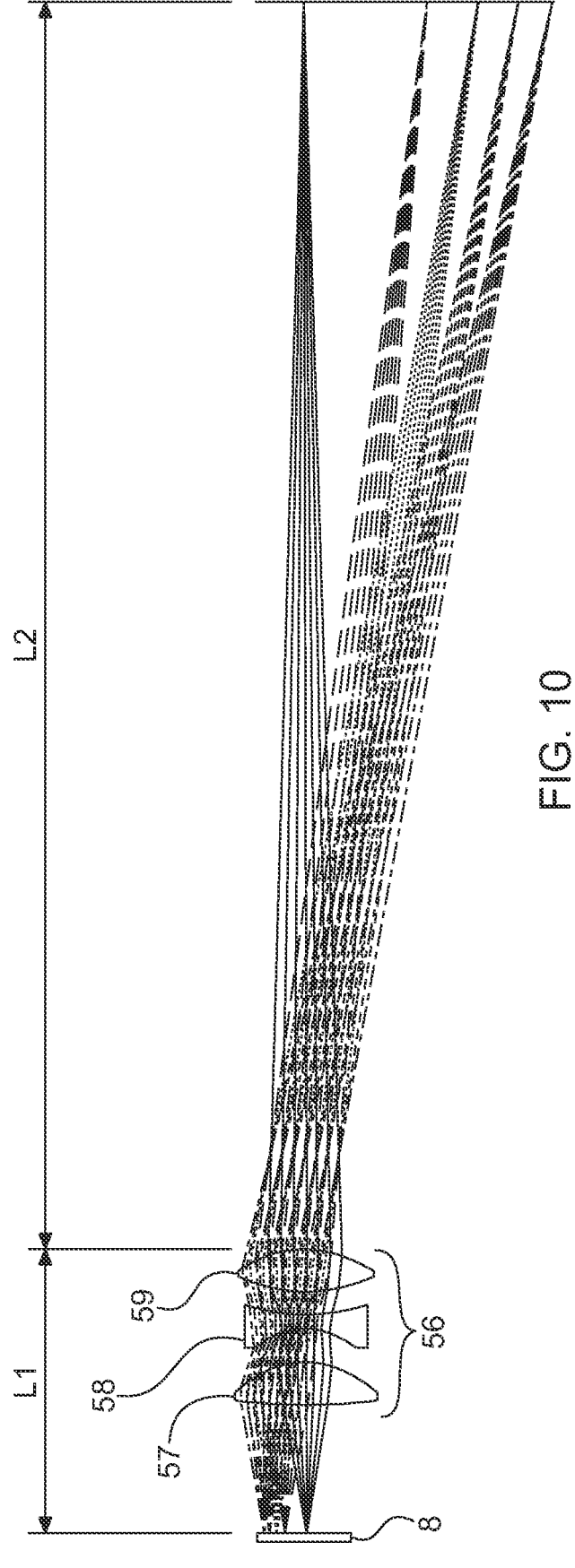
FIG. 10 is an illustration of the liquid crystal display screen and an alternative embodiment of the lens system.

The lens system may alternatively include lens 57, 58, and 59 arranged in a Triplet system, with one or more of lens 57, 58, or 59 being aspherical lenses. Such an arrangement is shown in FIG. 10. A length L1 from the LCD screen 8 to an end of the lens system can be 115 mm in one embodiment. A length L2 from the end of the lens system to a surface can be 500 mm in one embodiment.

Figure 11:
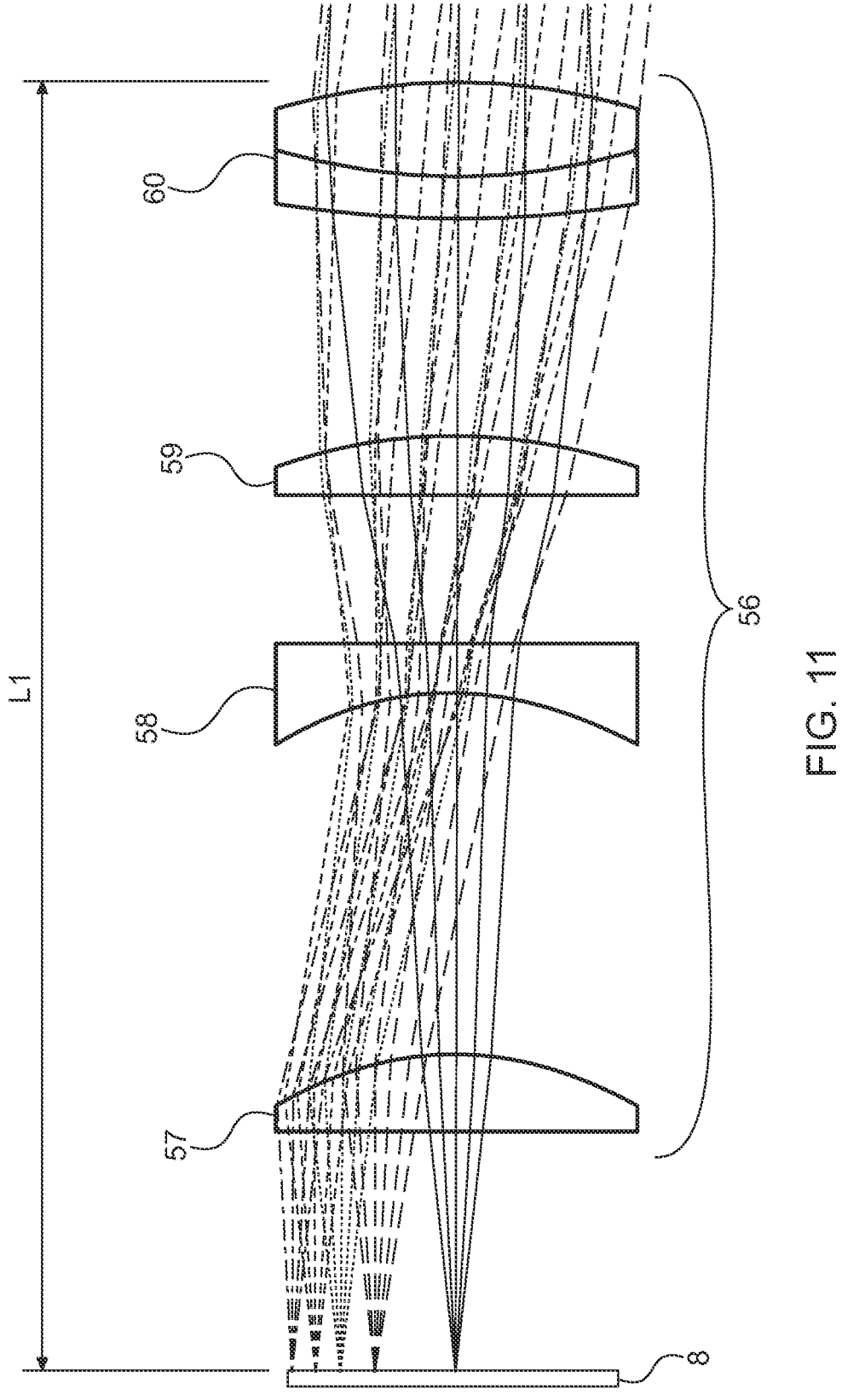
FIG. 11 is an illustration of the liquid crystal display screen and an alternative embodiment of the lens system.

The lens system may alternatively include lenses 57, 58, 59, 60 arranged as a shelf lens system, as shown in FIG. 11. This lens system is a variation of a Triplet system, shown in FIG. 11, and includes the lens 60, which is an additional front positive achromatic lens used to reduce overall system focal length. The length L1 of the lens system of FIG. 11 from the LCD screen 8 to the end of the lens system can be 90 mm in one embodiment.

Figure 12:
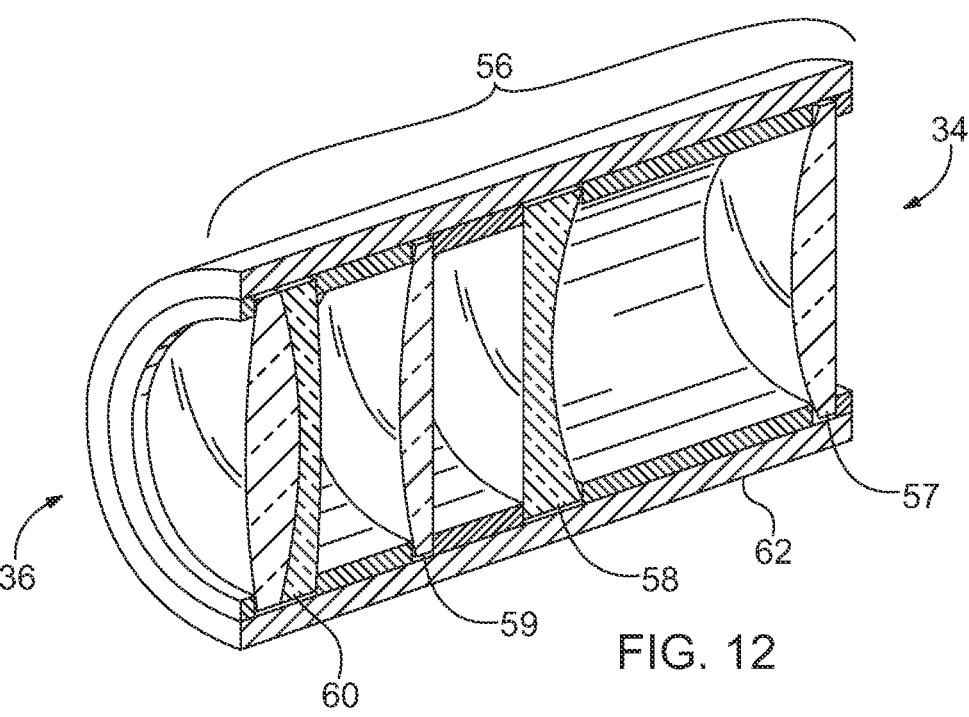
FIG. 12 is a perspective view along a longitudinal cross-section of a lens tube of the device housing the lens system of FIG. 11.
Figure 13:
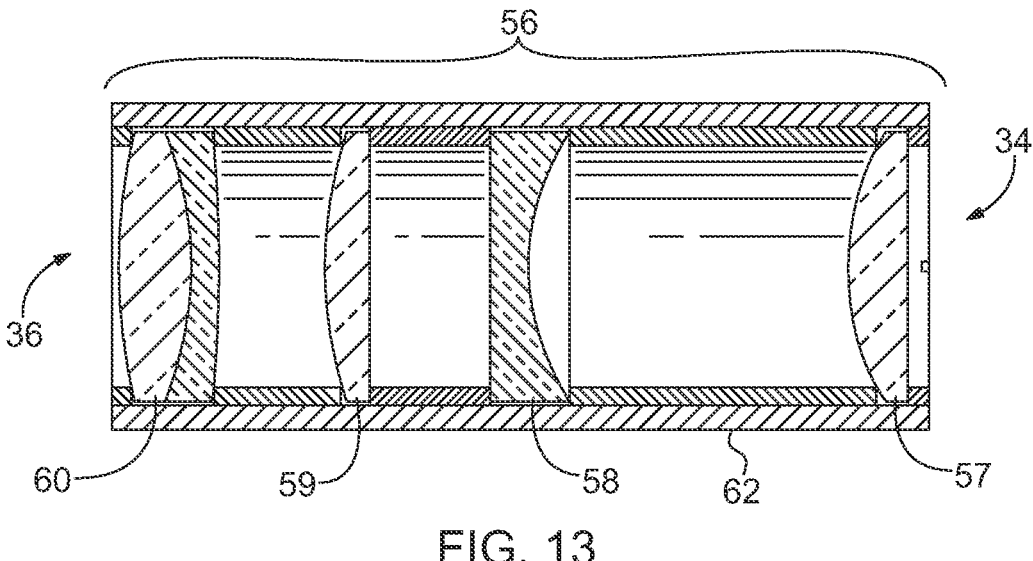
FIG. 13 is a longitudinal cross-sectional view of the lens tube of FIG. 12.

FIGS. 12 and 13 show the lens system 56 of FIG. 11 provided with a lens tube 62. The lens tube 62, as shown in FIG. 1, is housed with the housing 30 of the device 100. The lens tube 62 itself houses the various lenses 57, 58, 59, and 60, which together form the lens system 56. The lens tube 62 maintains relative distances between each lens 57, 58, 59, and 60 of the lens system 56, as necessary to achieve a desired focal length. The positioning of entire lens tube 62 along the longitudinal axis A may be adjustable within the housing 30 to adjust focus. The lens tube 62 is moved in toward end 34 to focus on a surface at a greater distance, and is moved out toward end 36 to focus on a surface at a closer distance to the device 100. The movement of the lens tube 62 may be manually controlled by a slidable member 64 attached to the lens tube and extending through the housing 30, or may be mechanized to be controllable via software and one or more buttons.

FIGS. 8A-8D provide illustrations and examples of methods of using the device 100 to improve literacy, including reading, writing, and comprehension skills. The light produced by the device 100, via the LED 20, attracts visual attention of a viewer to a targeted area 204 of a surface 200 illuminated by the light. Preferably, the targeted area 204 contains literal elements 206, which may include one or more letters, words, or sentences. Visual attention is preferably enhanced and attracted to the targeted area 204 through illumination of a surrounding area 202 with a surrounding light 25. Simultaneously, the targeted area 204 is illuminated by an image 23. The surrounding light 25 emitted from the device 100 is preferably white light. The image 23 preferably has a different color than that surrounding light 25, and may include different geometric shapes and/or alphabetic letters. Commonly, the image 23 is rectangular or linear in shape, to either highlight or underline, respectively, letters, words, or sentences in the targeted area.

Through the image 23, a user of the device 100 is able to visually mark or draw a viewer's attention, including the user or another person, to one or more literal elements 206. In turn, the literal elements marked by the image 23 may be used to teach spelling, morphology, phonics, vocabulary, etc.

Taking, for example, the word 'sheep' shown in FIG. 8B, a user intending to help teach a viewer phonetics and the pronunciation of the word 'sheep' could visually locate that word on a surface. Powering on the device 100 via the appropriate button 4 or 22, the user could select an appropriate shape for the image 23, i.e. a rectangle, to highlight different groups of letters for pronunciation. The user would then direct the surrounding light 25 to cover the area around the word 'sheep' to draw the viewer's attention to that word. The user would then cover the letters 'sh' of the word 'sheep' with the image 23 to practice phonetics of that syllable. Next, the user can move the image 23, and surrounding light 25 (as both 23 and 25 are emitted from the same source, LED 20), slightly to cover the letters 'ee' of the word 'sheep' to practice phonetics of that syllable. Lastly, the user can once again move the image 23 and surrounding light 25 to cover the letter 'p' of the word 'sheep'. The user can change the shape of the image 23 to reduce the size of the rectangle to better fit one letter. The user could then expand the image 233 to cover the entire word 'sheep', also changing color to emphasize the entire word over individual letters or syllables.

Additionally, the device can project the image 23 alone, without the surrounding light 25, allowing use of the device in an area of adequate lighting, such as in a home-schooling environment at a kitchen table, to capture and keep visual attention while processing auditory input at the same time, resulting in a substantial increase in learning and retention.

The image 23 is changeable based on the needs of the user and viewer. For example, the image 23 may appear as a blue rectangle in FIG. 8A covering the targeted area 204 of a single letter. The width of the image 23 is increased in FIG. 8B to cover the targeted area 204 of two letters. FIG. 8C shows the image 23 again increased in width to cover the targeted area 204 containing an entire word, and also may also be changed to show a yellow color. The shape of the image 23 is changed in FIG. 8D to a line instead of a rectangle. Again the image 23 is changeable among a variety of shapes, sizes, colors, brightness, and other similar qualities as desired by the user to help the viewer with improving literacy through different visualizations.

As previously discussed in relation to the buttons 4, 12, 13, 14, 15, 16, 17, 18, and 22, the color of the image 23 can be changed. The color of the image 23 may include, but is not limited to, red, blue, yellow, green, orange or violet. Any other color that may be produced by the LCD screen 8 is also contemplated. The surrounding light 25 is typically white light, but may be changed to at least any other color that the image 23 may be shown in. Conversely, the image 23 may be shown in white light. Again, the image 23 and surrounding light 25 are preferably different colors. The image 23 and surrounding light 25 may both include one or more colors.

The image may be in the form of a geometric shape, the shape of the image 23 being changeable. Typical shapes include, but are not limited to, a square, a circle, a triangle, a heart, a star, a hexagon, or a line. The image may include one or more other known geometrical shapes.

The image 23 can also be in the form of a single alphabetic letter or character, with the image changeable between all letters or characters of a single alphabet. The device may also be configured to be switchable between one or more alphabets. Such alphabets include, but are not limited to, English, Spanish, Hebrew, Japanese, Chinese, Hindi, and Arabic, as examples. Any other known written alphabet may be included.

A size of the image 23 is also changeable. The width and height of the image 23, or horizontal size and vertical size, are changeable to compensate for different sizes of literal elements.

The parameters of the image 23 and surrounding light 25 described herein are programmable and changeable via the microcontroller 3 and controllable by the user via one or more of the buttons 4, 12, 13, 14, 15, 16, 17, 18, and 22, the specific controls of which are also programmable by the user.

While certain structures, elements, and steps have been described as being part of one or more embodiments of the invention, it should be apparent to one ordinarily skilled in the art that such embodiments are not mutually exclusive. The embodiments described herein can be combined in order to create further embodiments which may not have been explicitly described.

We claim:

1. A method of improving literacy, comprising:

providing a non-digital medium with literal elements;

selecting a group of literal elements by using a light source to illuminate an area on a surface of the non-digital medium with a surrounding light; and visually directing the reader's attention to a specific literal element of the group of literal elements in the area by using the light source to illuminate or draw attention to the specific literal element with at least one image within the surrounding light, the at least one image being a color other than white and being a different color than the surrounding light on the surface of the non-digital medium;

wherein visually directing the reader's attention to the specific literal element assists the reader in learning reading and writing skills, wherein the light source is a device, comprising a longitudinal housing, configured to be held in one or both hands of a user, having opposed longitudinal ends;

a lens system longitudinally arranged within the longitudinal housing adjacent to an open end of the opposed longitudinal ends;

a circuit board housed within the longitudinal housing;

a light-emitting diode (LED) housed within the longitudinal housing;

a liquid crystal display (LCD) screen housed within the longitudinal housing; and a power source housed within the longitudinal housing, the power source connected, and supplying electrical power, to the circuit board, the light-emitting diode, and the LCD screen, wherein, when the power source supplies the electrical power, light is generated by the LED, through the LCD screen, and through the lens system and configured to be emitted onto a surface having one or more literary elements, and wherein the light emitted on the surface includes the at least one image and the surrounding light, the at least one image centralized within the surrounding light.

2. The method of claim 1, wherein the area illuminates white light.

3. The method of claim 1, wherein the area is circular in shape.

4. The method of claim 1, wherein the area covers a portion of the surface of the non-digital medium.

5. The method of claim 1, wherein a user other than the reader operates the light source.

6. The method of claim 1, wherein the at least one image is a shape, wherein the shape is a square, a circle, a triangle, a heart, a star, a hexagon, or a line.

7. The method of claim 1, wherein the at least one image is an alphabetical letter or character chosen from an alphabet.

8. The method of claim 1, wherein the at least one image has a color chosen from red, blue, yellow, green, orange or violet.

9. A method of improving literacy, comprising:

providing a non-digital medium with literal elements;

selecting a group of literal elements by using a light source to illuminate an area on a surface of the non-digital medium with a surrounding light; and visually directing the reader's attention to a specific literal element of the group of literal elements in the area by using the light source to illuminate or draw attention to the specific literal element with at least one image within the surrounding light, the at least one image being a color other than white and being a different color than the surrounding light on the surface of the non-digital medium;

wherein visually directing the reader's attention to the specific literal element assists the reader in learning reading and writing skills, wherein the light source includes a plurality of buttons to control parameters of the at least one image and the surrounding light, and, when the at least one image is a square or a rectangle, pressing a first button of the plurality of buttons doubles a width of the at least one image and pressing the first button of the plurality of buttons again returns the at least one image to an original width, and wherein, when the at least one image is the square or the rectangle, pressing a second button of the plurality of buttons quintuples the width of the at least one image and pressing the second button of the plurality of buttons again returns the at least one image to the original width.

10. The method of claim 9, wherein the area illuminates white light.

11. The method of claim 9, wherein the area is circular in shape.

12. The method of claim 9, wherein the area covers a portion of the surface of the non-digital medium.

13. The method of claim 9, wherein a user other than the reader operates the light source.

14. The method of claim 9, wherein the at least one image is a shape, wherein the shape is a circle, a triangle, a heart, a star, a hexagon, or a line.

15. The method of claim 9, wherein the at least one image is an alphabetical letter or character chosen from an alphabet.

16. The method of claim 9, wherein the at least one image has a color chosen from red, blue, yellow, green, orange or violet.

* * * * *